(12) United States Patent
Tosapong (10) Patent No.: US 12,229,613 B2
(45) Date of Patent: Feb. 18, 2025

(54) ANTI-TAMPER RADIO FREQUENCY IDENTIFICATION TRANSPONDER

(71) Applicant: STAR SYSTEMS INTERNATIONAL LIMITED, Hong Kong (HK)

(72) Inventor: Pradit Tosapong, Hong Kong (HK)

(73) Assignee: STAR SYSTEMS INTERNATIONAL LIMITED, Hong Kong (HK)

( * ) Notice: Subject to any disclaimer, the term of this patent is extended or adjusted under 35 U.S.C. 154(b) by 0 days.

(21) Appl. No.: 18/261,117

(22) PCT Filed: Feb. 28, 2022

(86) PCT No.: PCT/CN2022/078333
§ 371 (c)(1),
(2) Date: Jul. 12, 2023

(87) PCT Pub. No.: WO2023/159579
PCT Pub. Date: Aug. 31, 2023

(65) Prior Publication Data
US 2024/0370687 A1    Nov. 7, 2024

(51) Int. Cl.
*G06K 19/073*        (2006.01)

(52) U.S. Cl.
CPC ............................. *G06K 19/0739* (2013.01)

(58) Field of Classification Search
CPC ....... G06K 19/07372; G06K 19/07381; G06K 19/0739
See application file for complete search history.

(56) References Cited

U.S. PATENT DOCUMENTS

| | | | | |
|---|---|---|---|---|
| 6,121,880 A | * | 9/2000 | Scott | G07C 5/085 |
| | | | | 340/572.5 |
| 6,794,000 B2 | * | 9/2004 | Adams | G06K 19/0739 |
| | | | | 343/873 |
| 7,557,715 B1 | | 7/2009 | Noakes et al. | |
| 9,626,620 B2 | * | 4/2017 | McDowell | G06K 19/0776 |
| 2002/0135481 A1 | | 9/2002 | Conwell et al. | |
| 2006/0061475 A1 | * | 3/2006 | Moskowitz | G08B 13/2417 |
| | | | | 340/572.3 |

FOREIGN PATENT DOCUMENTS

| | | | |
|---|---|---|---|
| CN | 205721904 U | * | 11/2016 |
| CN | 108879069 A | | 11/2018 |
| JP | 2008116532 A | | 5/2008 |

\* cited by examiner

*Primary Examiner* — Edwyn Labaze
*Assistant Examiner* — April A Taylor
(74) *Attorney, Agent, or Firm* — Bayramoglu Law Offices LLC (57) ABSTRACT

An anti-tamper passive Radio Frequency Identification (RFID) transponder for attachment to a surface that is at least partially translucent includes: an RFID inlay, including an RFID Integrated Circuit (IC) chip connecting to an RFID antenna; and a first opaque label on a first side of the RFID inlay. When attached to the surface, the first opaque label is between the RFID inlay and the surface, and the first opaque label is viewable through the surface while preventing view of the RFID inlay through the surface. The first opaque label is with pre-cut lines. The passive RFID transponder and the pre-cut lines are configured and arranged such that when a removal of the passive RFID transponder from the surface is attempted, after being attached to the surface, the RFID antenna is damaged and the RFID inlay is rendered inoperable.

9 Claims, 8 Drawing Sheets

ANTI-TAMPER RADIO FREQUENCY IDENTIFICATION TRANSPONDER

CROSS REFERENCE TO THE RELATED APPLICATIONS

This application is the national phase entry of International Application No. PCT/CN2022/078333, filed on Feb. 28, 2022, the entire contents of which are incorporated herein by reference.

TECHNICAL FIELD

The present disclosure relates to a Radio Frequency Identification (RFID) transponder. In particular, it relates to an anti-tamper passive RFID transponder.

BACKGROUND

RFID is a technique used to identify objects by means of electromagnetic waves or radio frequency. An object may be tagged with an electronic code responding label. An electronic code responding label comprises an antenna and an Integrated Circuit (IC) chip.

In practice, RFID provides a quick and affordable means to identify objects. Upon receiving a valid interrogating signal from an interrogating source, such as from an interrogating antenna (or "transmitting and receiving antenna") of an RFID reader, the electronic code responding label responds according to its designed protocol. As the electronic code responding label has a unique identification code which relates to the object that the electronic code responding label is attached to, by communicating with the electronic code responding label to retrieve the unique identification code representing the object, one may identify the presence of the object simply by identifying the presence of the electronic code responding label. An electronic code responding label sometimes is known as a label, a tag, or a transponder, etc.

There are mainly two types of RFID transponders, active and passive. An active RFID transponder would have its own battery source, has a greater read range than a passive RFID transponder. However, an active RFID transponder is limited by the lifetime of its battery, and is more expensive and bulkier than a passive RFID transponder. A passive RFID transponder, on the other hand, is a transponder energised by an interrogating signal from an interrogating source (such as an RFID reader). It has a relatively shorter read range but has the advantage of cheaper price, smaller form factor, and the convenience of not needing replacement (due to the battery life) as compared with an active RFID transponder. It is vital that the antenna of a passive RFID transponder is designed well so that the interrogating signal may be received optimally to energise the RFID IC chip of the passive RFID transponder. When the RFID IC chip of the passive RFID transponder is powered, the same antenna is used by the RFID IC chip to transmit signal back to the RFID reader. With this back-and-forth wireless communication, an RFID communication link is set up successfully between the RFID reader and the passive RFID transponder. A common and simple form of a passive RFID transponder is a one-layered structure in the form of a thin label i.e. the passive RFID transponder is a single-layered design with its antenna realized on a dielectric substrate.

Common operating frequency band of RFID communication includes LF band, HF band, UHF band, and microwave band. The global UHF RFID frequency band (e.g. EPC Class 1 Gen 2/ISO 18000-6C standard) covers 860-960 MHz. For Europe, the ETSI band covers 865-868 MHz. In USA, the FCC band covers 902-928 MHz.

In general, an RFID transponder is physically attached firmly and securely on the surface of an object to be tagged, by strong adhesive substance, screws, punching through the object or even implanted inside a body of the object. Once an RFID transponder (with unique ID) has been physically attached to an object and the unique ID has been associated with the unique information of the tagged object, the RFID transponder is generally not to be (or not allowed to be) removed or transferred to another object unless there is a proper authorization to do so.

Apart from the conventional logistics and supply chain industries, RFID is an emerging technology in different industries for many applications such as Automatic Vehicle Identification (AVI) systems, congestion control, or Electronic Toll Collection (ETC) systems, traffic management, smart cities, etc. In the field of AVI and ETC, an AVI RFID transponder with a unique ID is attached to a vehicle, in a form of windshield tag, a headlamp tag, a car-plate tag, a rear-view mirror hang tag, vehicle roof tag, or other possible forms. When the tagged vehicle is passing through a designated read zone of an RFID reader, the tagged vehicle is automatically detected.

Among different forms of vehicle toll transponder, a passive RFID windshield transponder is the most common and popular choice due to its very thin profile, low costs, and no maintenance effort is needed. Due to the very high volume of vehicles in AVI or ETC industries, the amount of toll collections is tremendously huge. It not only requires a very high level of accuracy in identifying each vehicle with unique ID, but also requires the transponder attached to a vehicle is not transferable to another vehicle. If a toll tag is being able to be transferred from one vehicle to another vehicle without approval, the toll will be charged to a wrong account associated to the original vehicle and the whole passive RFID system for ETC becomes unreliable. Therefore, an anti-tamper transponder with high physical security is extremely important.

The present disclosure provides an alternative design of an anti-tamper passive RFID transponder with characteristics described with greater details in this specification.

SUMMARY

According to a first aspect of the present disclosure, there is provided an anti-tamper passive Radio Frequency Identification (RFID) transponder for attachment to a surface that is at least partially translucent, comprising: an RFID inlay, comprising an RFID IC chip connecting to an RFID antenna; and a first opaque label on a first side of the RFID inlay; wherein when attached to the surface, the first opaque label is between the RFID inlay and the surface, and the first opaque label is viewable through the surface while preventing view of the RFID inlay through the surface; wherein the first opaque label is with pre-cut lines; and wherein the passive RFID transponder and the pre-cut lines are configured and arranged such that when a removal of the passive RFID transponder from the surface is attempted, after being attached to the surface, the RFID antenna is damaged and the RFID inlay is rendered inoperable.

The objective of the present disclosure is to design an anti-tamper passive RFID transponder which has features of non-removable and non-transferrable, and the RFID antenna, which is connected to an RFID IC chip, of the RFID inlay are hidden within the passive RFID transponder structure. So, the RFID antenna is not viewable from any directions, and which allow full area of printability on both sides of the passive RFID transponder. Printability refers to any printable artworks that may be printed and/or displayed on both sides of the transponder including but not limited to colorful graphic, logo, photo, texts, numbers, barcode, quick response (QR) code, hologram, etc.

In one form, the RFID antenna is damaged in a way that at least a part of the RFID antenna stays with the opaque label on the surface, and at least another part of the RFID antenna is removed from the surface after the attempted removal.

In one form, the passive RFID transponder further comprises a Break-On-Removal (BOR) layer, wherein the BOR layer is configured and arranged to break the RFID antenna, during the attempted removal, to render the RFID inlay inoperable. In one form, the pre-cut lines are across at least a part of the RFID antenna or surrounding the entire RFID antenna.

In one form, the passive RFID transponder further comprises a Non-Removable Non-Transferable (NRNT) layer, wherein the NRNT layer is configured and arranged to break the RFID antenna, during the attempted removal, to render the RFID inlay inoperable, by having pre-cut lines across at least a part of the RFID antenna.

In one form, the pre-cut lines surround the entire RFID antenna and the RFID IC chip.

In one form, the pre-cut lines surround one or more parts of the RFID antenna and the RFID IC chip.

In one form, the passive RFID transponder further comprises a second opaque label on a second side of the RFID inlay, opposing the first side; wherein the first opaque label and the second opaque label cover the RFID inlay completely.

In one form, the surface is a windscreen, a windshield, a glass window, plastic/glass cover of vehicle lamp or a light cover of a vehicle.

In one form, the passive RFID transponder further comprises the following layers in sequence:
a. a transparent or clear top layer with adhesive;
b. a first adhesive layer;
c. a substrate layer;
d. a Break-On-Removal (BOR) layer or a Non-Removable Non-transferable (NRNT) layer;
e. an RFID inlay layer comprising the RFID inlay;
f. a second adhesive layer with pre-cut lines;
g. a first opaque layer comprising the first opaque label with pre-cut lines;
h. a third adhesive layer for sticking on the surface;
i. a removable release layer or liner for covering the third adhesive layer, which is removed before the passive RFID transponder is attached to the surface.

In one form, the passive RFID transponder further comprises a second opaque label between the a) transparent or clear top layer with adhesive and b) the first adhesive layer.

BRIEF DESCRIPTION OF THE DRAWINGS

Embodiments of the present disclosure will be discussed with reference to the accompanying drawings wherein.

DETAILED DESCRIPTION OF THE EMBODIMENTS

Existing anti-tamper passive transponders use different techniques, including using the Break-On-Removal (BOR) feature, or the Non-Removable Non-Transferable (NRNT) feature. The BOR feature and the NRNT feature may be applied to a passive toll transponder to provide physical security and anti-tamper features. When a passive toll transponder, with a BOR feature, which is attached the surface of a vehicle such as the windshield of the vehicle, is being tampered or removed, the tampering or removal action will render the transponder inoperable in that the antenna of the transponder is damaged. When a passive toll transponder, with a NRNT feature, which is attached the surface of a vehicle such as the windshield of the vehicle, is being tampered or removed, only part of the transponder, for example a cover plastic layer, is removed with the antenna firmly stuck on the windshield. The RFID antenna, which is connected to the IC chip, is not damaged at this point, and so it can still be used properly. While the firmly affixed antenna may be forcibly removed, there is a high likelihood that the RFID antenna may be damaged and be inoperable. Therefore, the passive RFID transponder cannot be transferred to another surface without damaging the RFID antenna.

Accordingly, the aim that the RFID antenna, which is connected to the RFID IC chip, of the passive RFID transponder is prevented from being transferred to another vehicle is successfully achieved.

However, it has been discovered that anti-tamper passive RFID transponders with the BOR feature or the NRNT feature have a shortcoming, which is explained with reference to FIG. 1A and FIG. 1B.

Figure 1A:
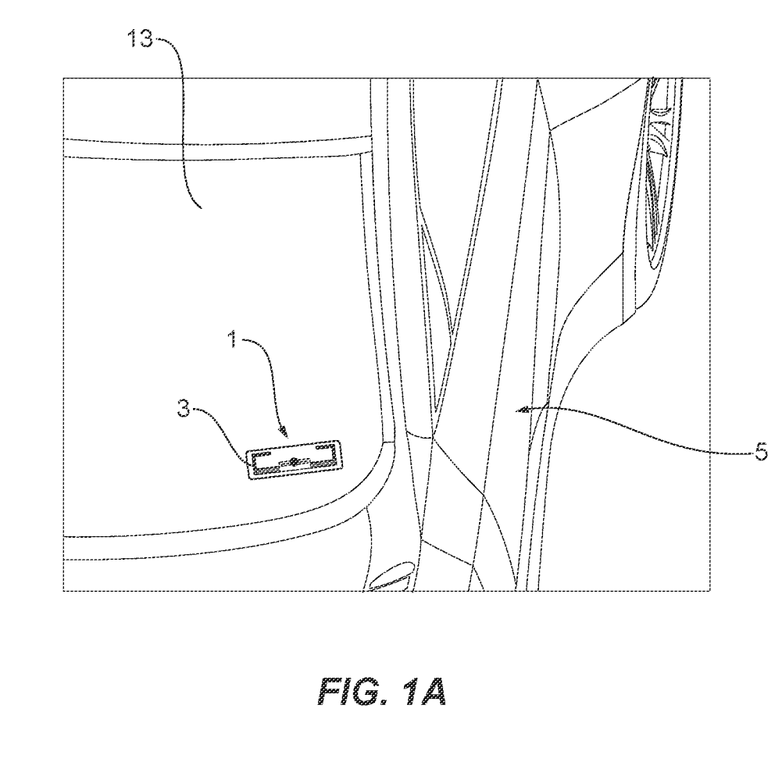
FIGS. 1A and 1B depict a prior art anti-tamper passive RFID transponder applied on a vehicle.
Figure 1B:
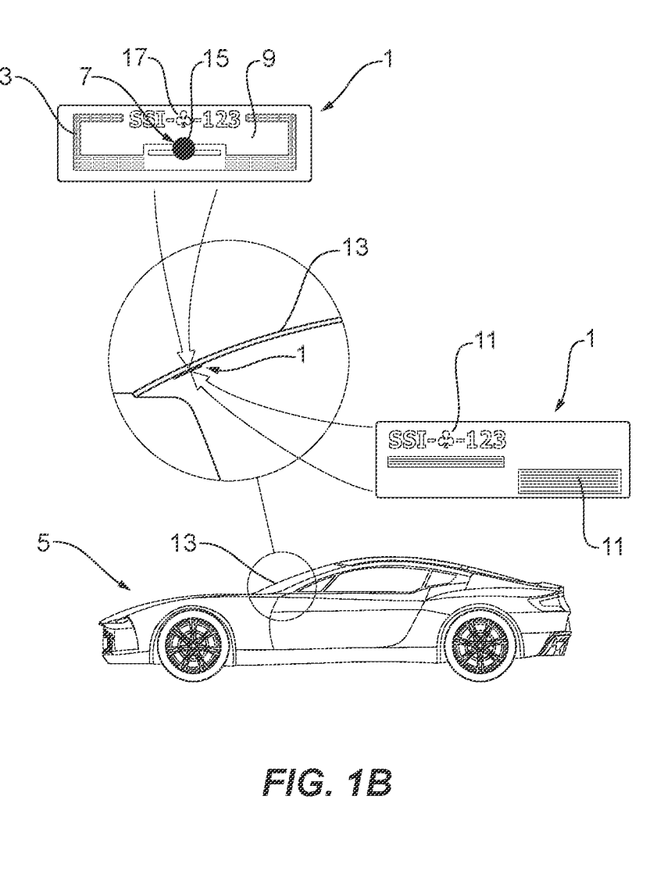

Referring to FIG. 1A and FIG. 1B, a passive RFID transponder 1 is attached to an inside of a windshield 13 of a vehicle 5. The passive RFID transponder comprises an RFID antenna 3, an RFID IC chip 15, which is covered by an Ultraviolet (UV)/Infrared (IR) protection black dot 7 and is connected to the RFID antenna 3, and a sheet 9 supporting the RFID antenna 3, the RFID IC chip 15 and the UV/IR protection black dot 7. The RFID antenna 3 and the RFID IC chip 15 are both on a same side of the sheet 9. The UV/IR protection black dot 7 may also be on the same side as RFID antenna 3 and RFID IC Chip 15 of the sheet 9 or on both sides of sheet 9 to cover the RFID IC chip 15 completely. Sheet 9 may be printed on both sides. On the side facing the windshield (windshield side, adhesive side or bottom side), there will be limited space for printed information 17 to be shown outwardly. On the other side facing the interior of the vehicle (driver side, non-adhesive side or top side), all the areas may be used for printing graphic and text information. For example, graphic and text information 11 may be included.

However, for existing passive RFID transponders, with the BOR feature or the NRNT feature, the RFID antenna 3 and the UV/IR protection black dot 7, covering the RFID IC chip 15, are affixed to the windshield 13 without any additional sheet in between "the RFID antenna 3 and the UV/IR protection black dot 7, covering the RFID IC chip 15" and the "windshield 13". Else, the BOR feature or the NRNT feature may be circumvented by peeling off the additional sheet from the windshield 13. As a result, the RFID antenna 3 and the UV/IR protection black dot 7, covering the RFID IC chip 15, are visible from outside the vehicle as shown in FIG. 1A. This is unsightly, and only limited printed information, due to limited available area for printing information, on the transponder may be shown outwardly.

Accordingly, the present disclosure provides an alternative design of an anti-tamper passive RFID transponder, which is with an anti-tamper feature such as BOR or NRNT, but with its RFID antenna and RFID IC chip hidden from the view at least from outside of the vehicle. As mentioned previously, sticking an additional sheet between a windshield and a passive RFID transponder to cover the RFID antenna and the RFID IC chip would not work as that would circumvent the anti-tamper feature (due to BOR layer or due to NRNT layer) of the anti-tamper passive RFID transponder.

In a general form of the present disclosure there is provided an anti-tamper passive RFID transponder for attachment to a surface that is at least partially translucent.

The phrase "at least partially translucent" refers to a surface that is at least a semi-transparent surface, and includes a completely transparent surface. For example, the surface includes a windshield of a vehicle that is transparent, semi-transparent, tinted etc. It may also include a light cover. While, the example given with respect to FIGS. 1A and 1B is a car, the term "vehicle" describing any moving objects with or without driver or pilot include a car, a sedan, a minivan, a van, an SUV, a truck, a bus, a wagon, a motorbike, a boat, an aircraft, an elevator, a train, a train compartment, unmanned vehicle, drone, etc., as long as there is a surface and there is need to attach a passive RFID transponder.

The anti-tamper passive RFID transponder comprises: an RFID inlay, comprising an RFID IC chip connecting to an RFID antenna; and a first opaque label on a first side of the RFID inlay. The anti-tamper passive RFID transponder is designed that when attached to the surface, the first opaque label is between the RFID inlay and the surface, and the first opaque label is viewable through the surface while preventing view of the RFID inlay through the surface.

In this disclosure, unless specified otherwise, the term "inlay" is used to represent a combination of an RFID antenna connected to an RFID IC chip. This is to differentiate from a transponder a tag, or a label. The term "opaque" simply means that the first opaque label is able to hide the RFID inlay from being viewed from outside the vehicle.

Further, the first opaque label is with pre-cut lines; and wherein the passive RFID transponder and the pre-cut lines are configured and arranged such that when a removal of the passive RFID transponder from the surface is attempted, after being attached to the surface, the RFID antenna is damaged and that the RFID inlay is rendered inoperable.

Figure 2A:
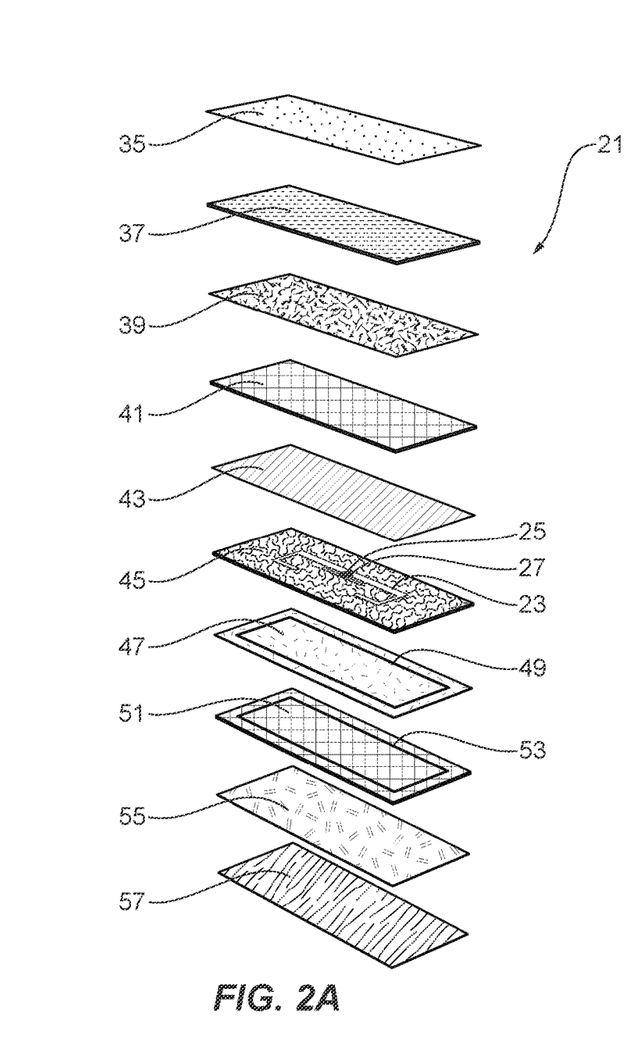
FIGS. 2A and 2B depict one embodiment of the present disclosure.
Figure 2B:
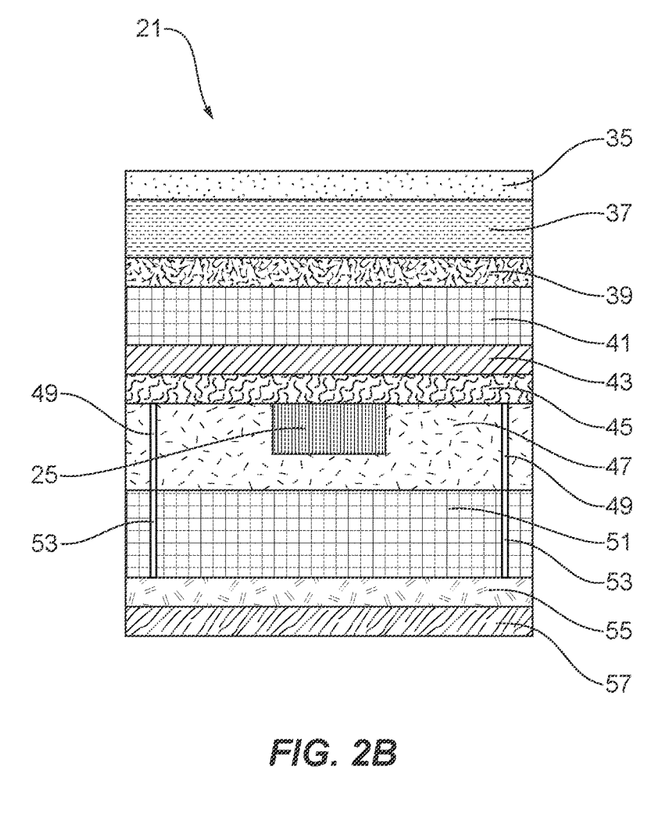

Pre-cut lines are explained in further details with reference to one embodiment of the present disclosure depicted in FIG. 2A and FIG. 2B.

With reference to FIG. 2A and FIG. 2B, there is provided a passive RFID transponder 21 according to one embodiment of the present disclosure. FIG. 2A depicts an exploded view of the layers of the passive RFID transponder 21 in 3-Dimensions, while FIG. 2B depicts a zoom in side view of an unexploded passive RFID transponder 21. When applied correctly on a surface, the top direction of the FIG. 2A and FIG. 2B faces the interior of a vehicle while the bottom direction faces the surface (e.g. windshield). From top to bottom, the layers are:

a. a transparent or clear top coated layer with adhesive 35;
b. a second opaque layer comprising the second opaque label 37;
c. a first adhesive layer 39;
d. a substrate layer 41;
e. a BOR layer or a NRNT layer 43;
f. an RFID inlay layer 45 comprising an RFID antenna 23 and an RFID IC chip 25 connected to the RFID antenna 23. A UV/IR protection black dot 27 is covering the RFID IC chip 25;
g. a second adhesive layer 47 with pre-cut lines 49;
h. a first opaque layer comprising the first opaque label 51 with pre-cut lines 53;
i. a third adhesive layer 55 for sticking on the surface; and
j. a removable release layer or liner 57 for covering the third adhesive layer 55, which is removed before the passive RFID transponder is attached to the surface.

In one exemplary form, the transparent or clear top coated layer 35 is a Polyethylene Terephthalate (PET) clear top coated layer; the second opaque label 37 is a PET printed layer; the first opaque label 51 is another PET printed layer. The transparent or clear top coated layer 35 may be PET or Polypropylene (PP) or coated vanish or any material which is printable. Adhesive layer may be transfer adhesive or permanent adhesive. Material for substrate layer may be PET, PP or any material which is suitable for making RFID inlay.

In another embodiment, the second opaque label 37 may be omitted, so that the RFID inlay is visible from the top direction of the FIG. 2A and FIG. 2B or from inside of the vehicle, but the first opaque label 51 would block the view of the RFID inlay from the bottom direction of the FIG. 2A and FIG. 2B or from outside of the vehicle.

Pre-cut lines 49 on the second adhesive layer 47 and the pre-cut lines 53 on the first opaque label 51 are to ensure that the BOR feature or the NRNT feature offered by the BOR layer or a NRNT layer 43 functions just as without the first opaque label 51. The first opaque label 51 functions to cover the RFID inlay from being viewed from outside of the vehicle, and also to provide a sizable area to contain printed information, to be shown outside of the vehicle.

In particular, the pre-cut lines 49 on the second adhesive layer 47 and the pre-cut lines 53 on the first opaque label 51 are designed to provide an anti-tamper mechanism even with the additional first opaque label 51.

For the case of a passive RFID transponder with the BOR feature, the RFID antenna 23 is broken when the transponder is being tampered. To effectively degrade the antenna performance when being tampered, the pre-cut lines cross the RFID antenna 23. More examples are provided as FIGS. 8A to 8H.

For the case of a passive RFID transponder with the NRNT feature, part of the first opaque label 51 is broken when the transparent or clear top coated layer 35 and/or the second opaque label 37 is peeled off to remove the transponder. The effect is that the RFID inlay will remain fixed to the first opaque label 51 through a strong second adhesive layer 47. The first opaque label 51 is attached to the surface through a strong third adhesive layer 55.

The pre-cut lines are thin cuts. Depending on preferences and designs, pre-cut lines may be so thin that it is not visibly obvious, or it may be visible too as part of a design. The exact size of the pre-cut lines may vary, as it depends on the thickness of the tools used such as the cutting blade used, the cutting angle, and also the thickness of the layer 47 or thickness of the first opaque label 51. For example, the pre-cut lines are about 5-10 μm in width, but other size is also possible.

The pre-cut lines 49 on the second adhesive layer 47 and the pre-cut lines 53 on the first opaque label 51 may or may not coincide.

With the introduction of pre-cut lines and the additional first opaque label, the passive RFID transponder becomes a reliable anti-tamper passive RFID transponder yet with the first opaque label to cover the RFID inlay from being viewed from outside of the vehicle, and with the first opaque label to provide a bigger space to display printed information to outside of the vehicle.

Figure 3:
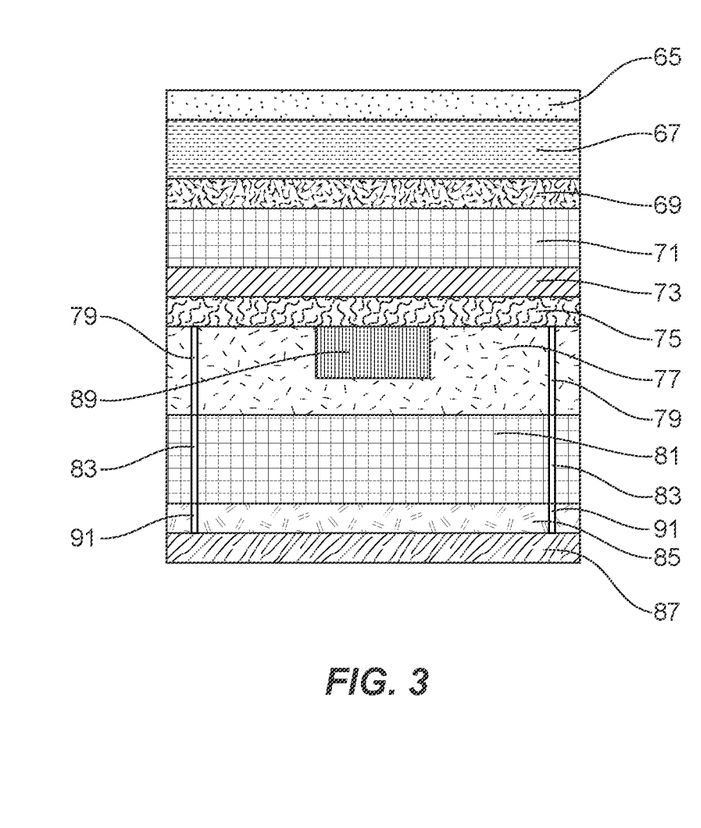
FIG. 3 depicts another embodiment of the present disclosure.

FIG. 3 depicts another embodiment of the present disclosure. In this embodiment, from top to bottom, the layers are:
a. a transparent or clear top coated layer 65;
b. a second opaque layer comprising the second opaque label 67;
c. a first adhesive layer 69;
d. a substrate layer 71;
e. a BOR layer or a NRNT layer 73;
f. an RFID inlay layer 75 comprising an RFID antenna which is usually at the same layer with the RFID inlay layer 75, and an RFID IC chip 89;
g. a second adhesive layer 77 with pre-cut lines 79;
h. a first opaque layer comprising the first opaque label 81 with pre-cut lines 83;
i. a third adhesive layer 85 for sticking on the surface with pre-cut lines 91; and
j. a removable release layer or liner 87 for covering the third adhesive layer 85, which is removed before the passive RFID transponder is attached to the surface.

This embodiment is generally the same with the embodiment of FIG. 2A and FIG. 2B, with the exception that the third adhesive layer 85 is also with pre-cut lines 91. The pre-cut lines 79 on the second adhesive layer 77, the pre-cut lines 83 on the first opaque label 81, and the pre-cut lines 91 on the third adhesive layer 85 may or may not coincide.

Figure 4:
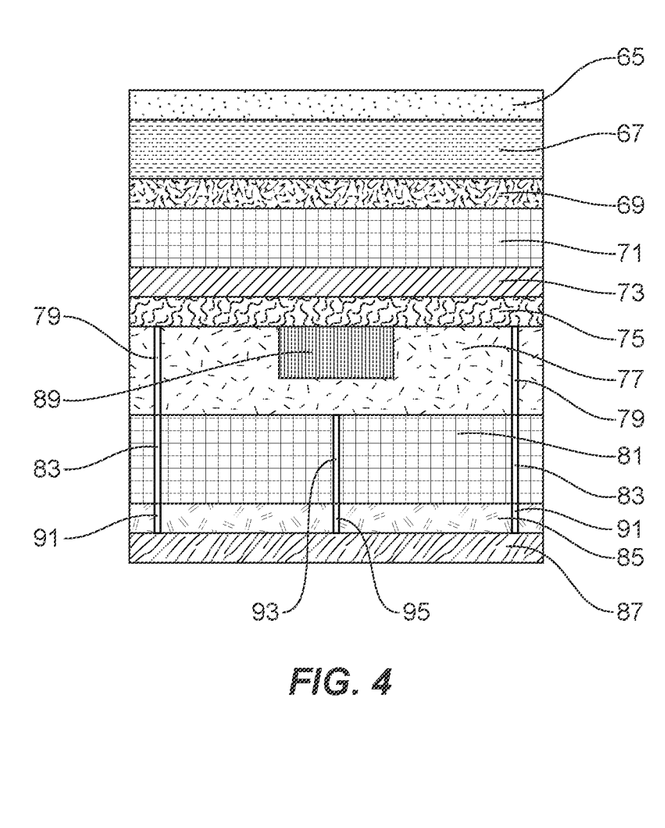
FIG. 4 depicts another embodiment of the present disclosure.

FIG. 4 depicts another embodiment of the present disclosure. This embodiment is the same with the embodiment of FIG. 3 with additional pre-cut lines 93, and pre-cut lines 95 in the first opaque label 81 and the third adhesive layer 85 respectively. The pre-cut lines 93 on the first opaque label 81 and the pre-cut lines 95 on the third adhesive layer 85 may or may not coincide.

Figure 5:
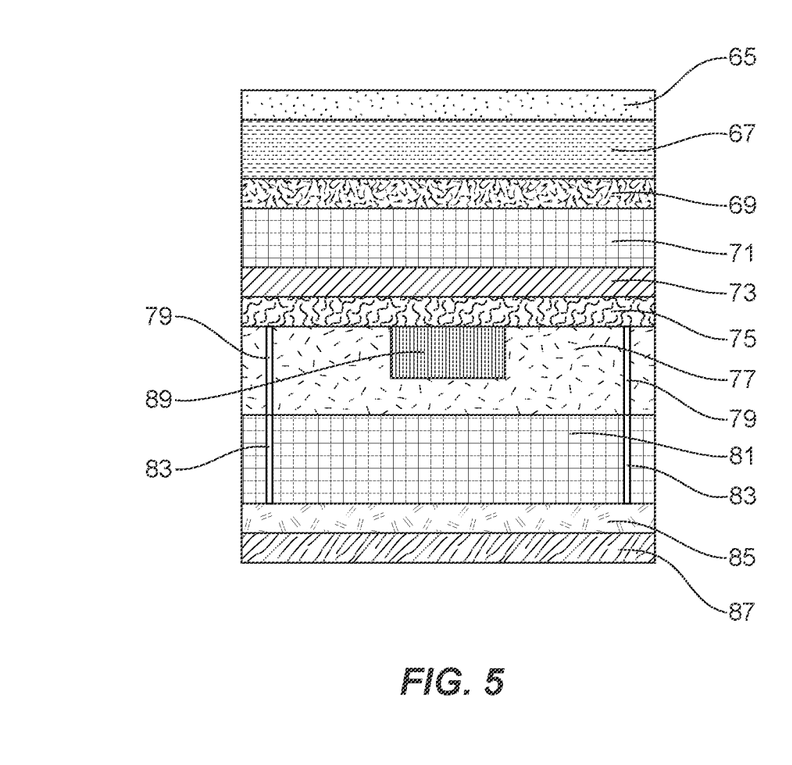
FIG. 5 depicts another embodiment of the present disclosure.

FIG. 5 depicts another embodiment of the present disclosure. This embodiment is the same with the embodiment of FIG. 3 with the second opaque label 67 having multiple layers.

Figure 6:
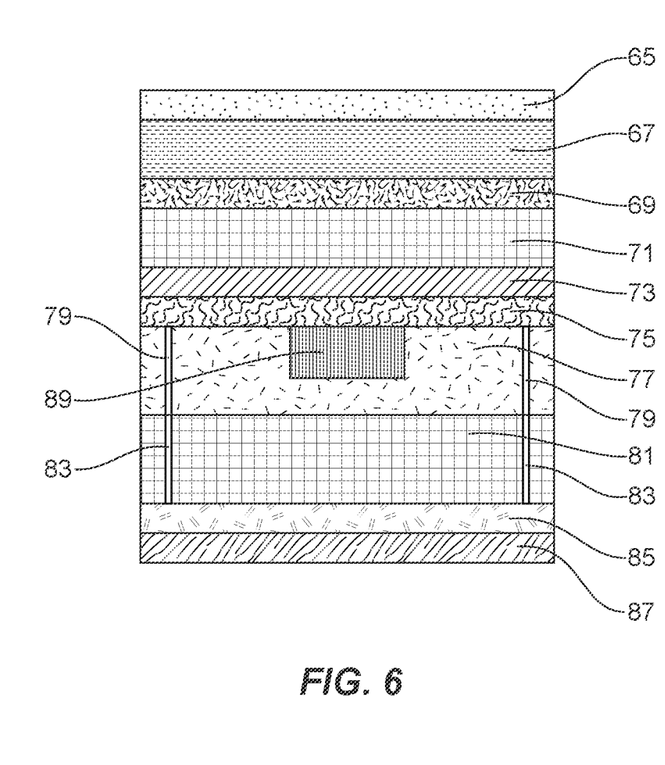
FIG. 6 depicts another embodiment of the present disclosure.

FIG. 6 depicts another embodiment of the present disclosure. This embodiment is the same with the embodiment of FIG. 3 with the first opaque label 81 having multiple layers.

Figure 7A:
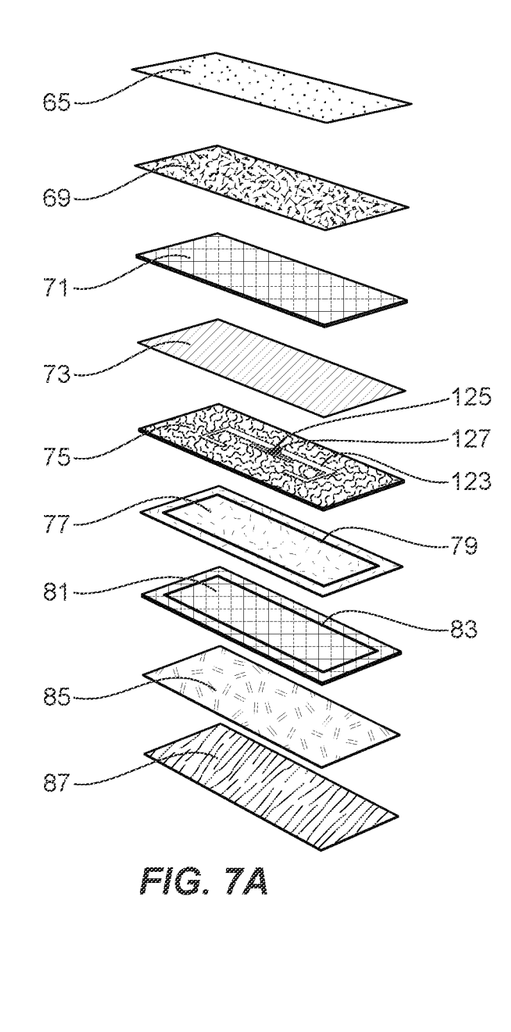
FIGS. 7A and 7B depict another embodiment of the present disclosure.
Figure 7B:
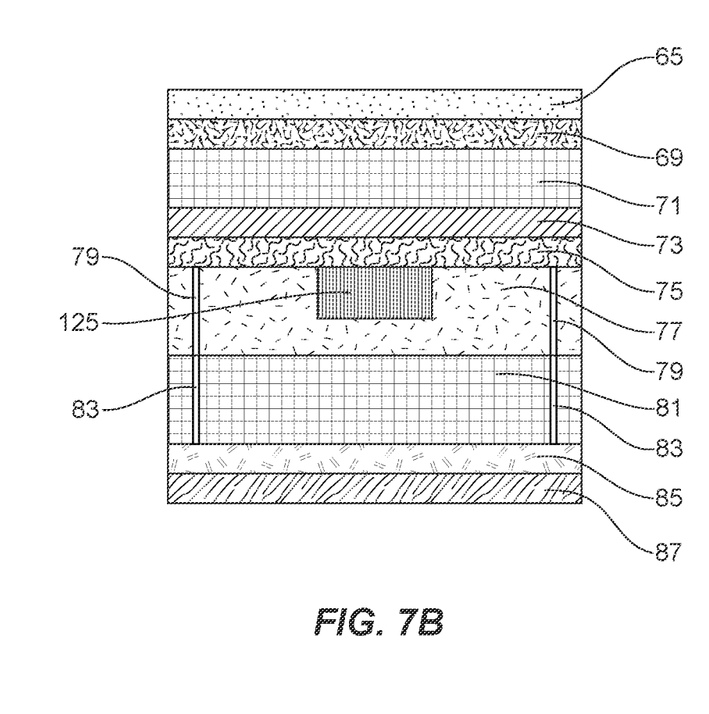

FIGS. 7A and 7B depict another embodiment of the present disclosure. This embodiment is the same with the embodiment of FIG. 3 with the second opaque label 67 removed, and with the first opaque label 81 printed on both sides. So, the printed information on the windshield side (adhesive side) may be viewed from outside of the vehicle, and the printed information on the driver side (non-adhesive side) may be viewed from inside of the vehicle. In FIG. 7A, RFID antenna 123 is on the RFID inlay layer 75. The RFID antenna 123 is connected to the RFID IC Chip 125, which is covered by the UV/IR protection black dot 127.

Figure 8A:
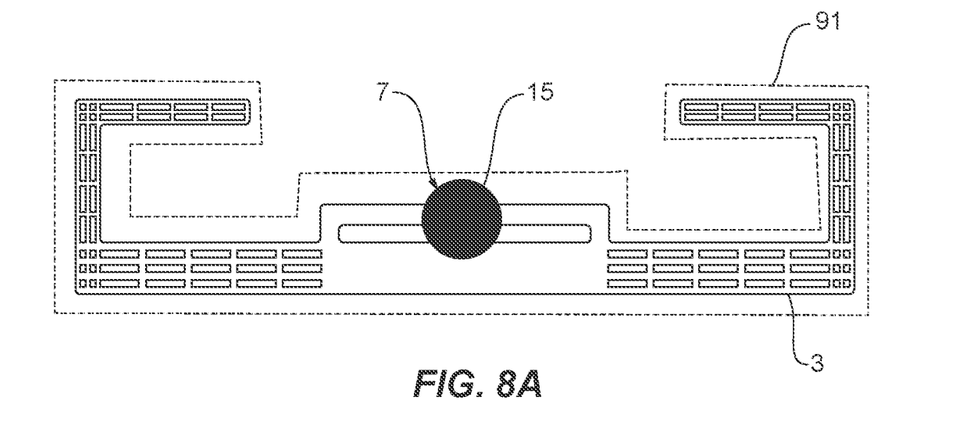
FIGS. 8A to 8H depict various embodiments of pre-cut lines.
Figure 8B:
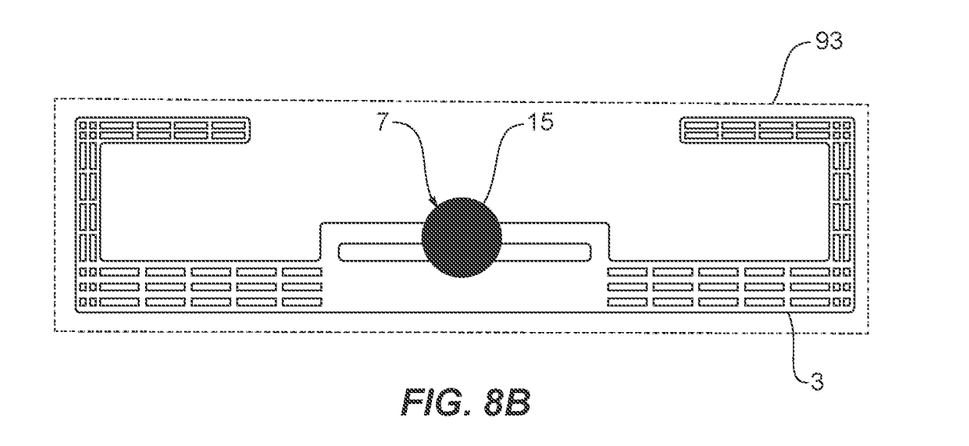

FIGS. 8A to 8H depict various exemplary embodiments of pre-cut lines on the first opaque labels 51 and 81, and on adhesive layers 47, 77, 85. In FIG. 8A, pre-cut lines 91 surround the RFID antenna 3 and the RFID IC chip 15, which is covered by the UV/IR protection black dot 7. This is useful when the NRNT security feature is applied, and that the RFID antenna 3 and the RFID IC chip 15 remain attached to the first opaque label, which is attached to the surface when a removal of the RFID tag is attempted. Similar to the embodiment of FIG. 8A, in FIG. 8B, pre-cut lines 93 define a polygon that surround the RFID antenna 3 and the RFID IC chip 15, which is covered by the UV/IR protection black dot 7, and that this is useful when the NRNT security feature is applied. The RFID antenna 3 and the RFID IC chip 15 remain attached to the first opaque label, which is attached to the surface when a removal of the RFID tag is attempted.

Figure 8C:
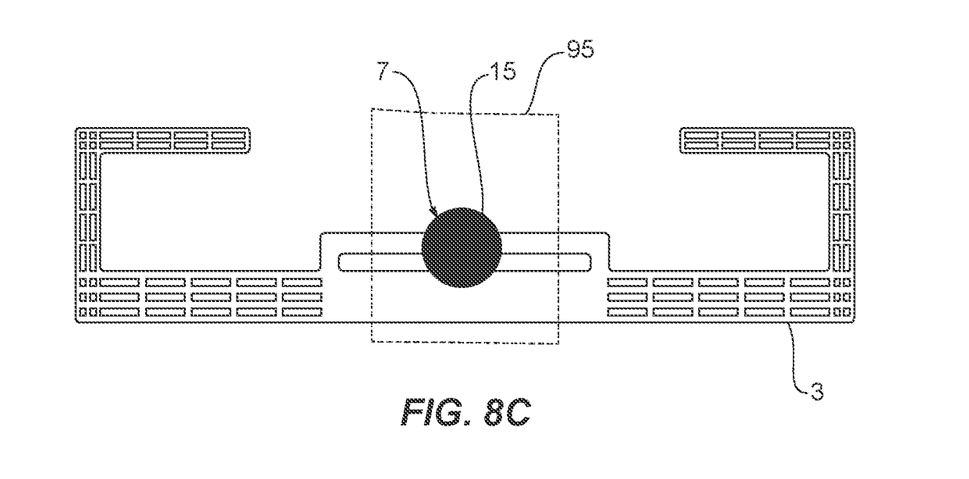

In FIG. 8C, pre-cut lines 95 define an area that surround the RFID IC chip 15, which is covered by the UV/IR protection black dot 7, and cut through part of the RFID antenna 3. This is useful when the BOR security feature is applied, and that only part of the RFID antenna 3 and the RFID IC chip 15 remain attached to the first opaque label, which is attached to the surface when a removal of the RFID tag is attempted, and the RFID antenna 3 is damaged as part of it (outside the area of pre-cut lines 95) is separated from another part of it (inside the area of pre-cut lines 95).

Figure 8D:
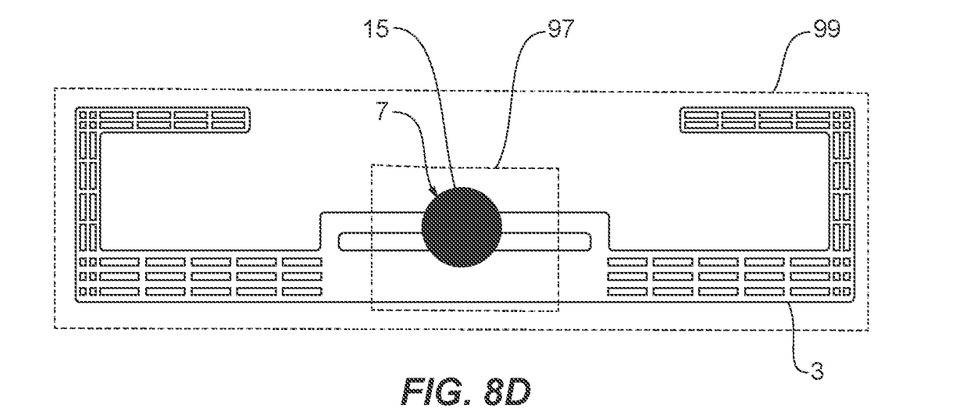
Figure 8E:
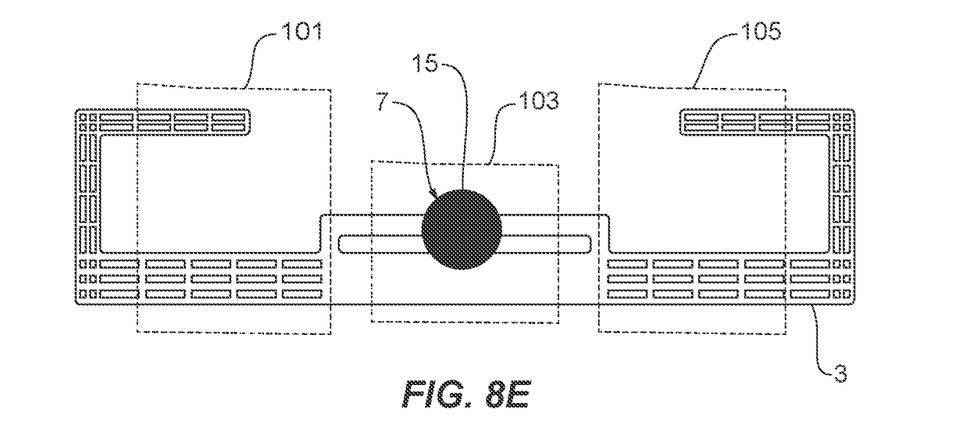

In FIG. 8D, pre-cut lines 97 and 99 define two areas. When a removal of the RFID tag is attempted, the area defined by pre-cut lines 97 remain attached to the first opaque label, which is attached to the surface. Similarly, in FIG. 8E, pre-cut lines 101, 103 and 105 define three areas. When a removal of the RFID tag is attempted, the area defined by pre-cut lines 101, 103 and 105 remain attached to the first opaque label, which is attached to the surface.

Figure 8F:
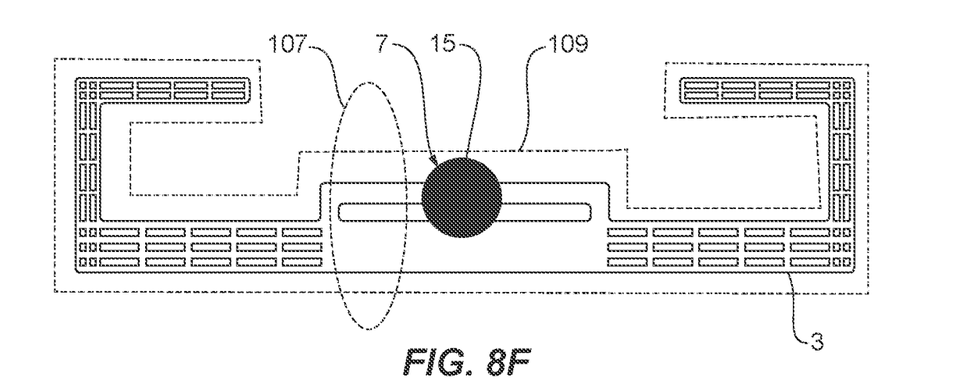

In FIG. 8F, pre-cut lines 107 and 109 define two areas. When a removal of the RFID tag is attempted, the area defined by pre-cut lines 107 is removed from the first opaque label, which is attached to the surface.

Figure 8G:
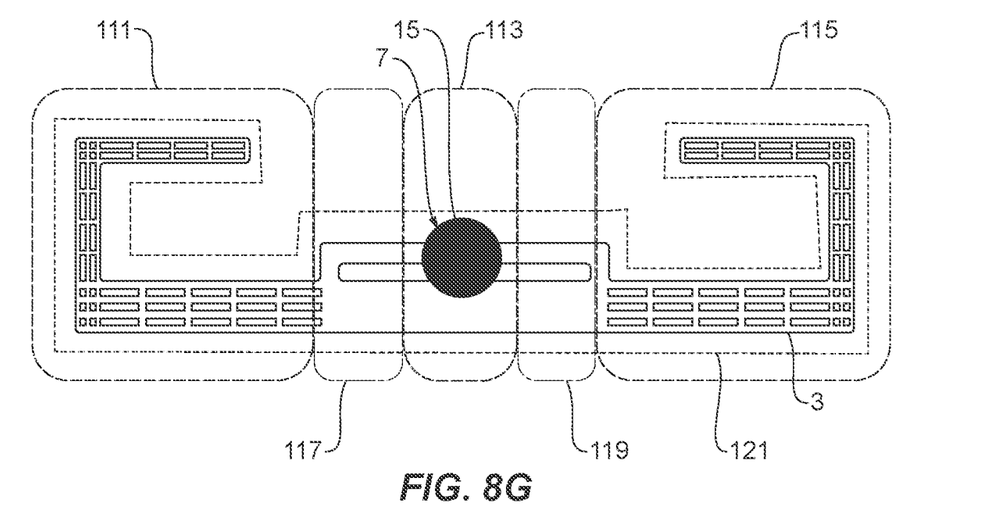

In FIG. 8G, pre-cut lines 111, 113, 115, 117, 119 and 121 define multiple areas. Selected areas may remain on the first opaque label, which is attached to the surface or be removed from the first opaque label, which is attached to the surface, so that the RFID antenna 3 is damaged and is no longer operable, when a removal of the RFID tag is attempted.

Figure 8H:
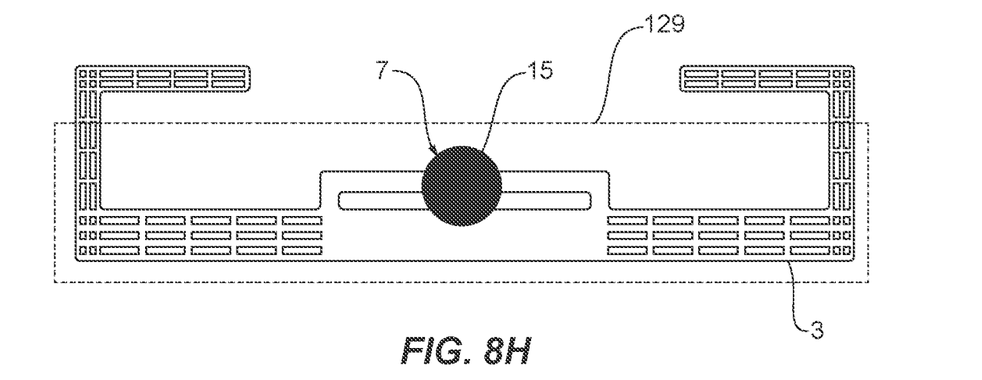

Similar to FIG. 8C, in FIG. 8H, pre-cut lines 129 define an area that surround the RFID IC chip 15, which is covered by the UV/IR protection black dot 7, and cut through part of the RFID antenna 3. This is useful when the BOR security feature is applied, and that only part of the RFID antenna 3 and the RFID IC chip 15 remain attached to the first opaque label, which is attached to the surface when a removal of the RFID tag is attempted, and the RFID antenna 3 is damaged as part of it (outside the area of pre-cut lines 129) is separated from other part of it (inside the area of pre-cut lines 129).

Figure 8I:
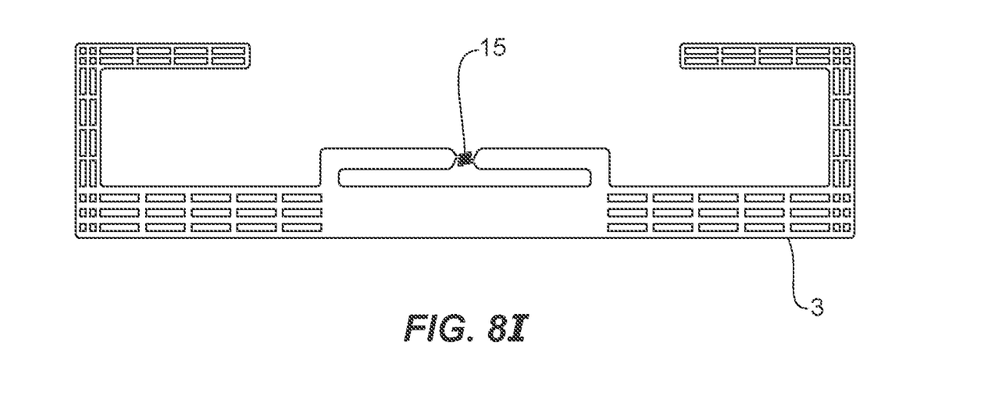
FIG. 8I depicts an exemplary RFID transponder without a UV/IR protection black dot.

In FIG. 8I, it shows an RFID antenna 3 without the UV/IR protection black dot 7. The RFID IC chip 15 is not covered by the UV/IR protection black dot 7. It is clear to see that the RFID IC Chip 15 is connected to the RFID antenna 3.

In summary, compared with the prior art, this embodiment of the anti-tamper passive RFID transponder offers the following advantages:

With the additional printable layer (the first opaque label 51 or 81), the whole passive RFID transponder becomes fully printable on both sides (on the side of first opaque label facing outside, adhesive side, windshield side, bottom side; and on the side of the second opaque label facing inside, non-adhesive side, driver side, top side), for example, colorful graphic artwork may be printed on both non-adhesive side (top side/driver side) and adhesive side (bottom side/windshield side).

The pre-cut lines at the additional printable layer (the first opaque label 51 or 81) are not noticeable when looking from the windshield side because the lines are very tiny.

The RFID inlay layer is interleaved/sandwiched inside the whole passive RFID transponder structure. The unpleasant antenna structure is hidden inside, which is favorable and desirable, and the antenna structure is not visible.

The additional printable layer (the first opaque label 51 or 81) also provides more space for printing artwork that faces outside (the windshield side), no need to enlarge the overall tag size as conventional windshield toll tag with one printable layer.

No double-sided printing is needed on the artwork layer (the opaque label), as there are two printable artwork layers, the "the second opaque label 37 or 67" and "the first opaque label 51 or 81". A single-side printing would be sufficient to show artworks to inside and outside of the vehicle.

The additional printable layer (the first opaque label 51 or 81) also helps to reduce the intensity of UV light (sunlight) directly shine on the transponder antenna, and also prevents the RFID IC chip from being exposed directly to UV light. It is desirable as long exposure of UV light may damage the RFID IC chip because of the very high temperature on the RFID IC chip. The common way such as providing a "UV/IR protection black dot 7" (made of black epoxy) covering the RFID IC Chip to prevent UV light damage may be omitted.

Alternatively, the artwork layer on the driver side (second opaque label 37) may be removed, leaving only one artwork layer (the first opaque label 51) on the windshield side (single-side or double-side printing), still hiding the transponder antenna structure from being seen from outside, and keeping the physical-tag-security feature working properly.

In the embodiments presented above, a passive UHF RFID transponder is used as an example. However, the anti-tamper structures of the present disclosure may be applied to other types of RFID transponder, for example, a passive HF RFID transponder, an RFID transponder with NFC capability etc.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers. Moreover, the words "connects, connected, connecting, etc." used between RFID antenna and RFID IC chip may mean either physically/electrically connected or non-physically/capacitively connected. The word "covers, covered, covering" used in an RFID IC chip being "covered" by the UV/IR protection black dot means either covered on one side or both sides of the RFID inlay layer.

The reference to any prior art in this specification is not, and should not be taken as, an acknowledgement or any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. An anti-tamper passive Radio Frequency Identification (RFID) transponder for attachment to a surface that is at least partially translucent, comprising:
    an RFID inlay, comprising an RFID Integrated Circuit (IC) chip connecting to an RFID antenna; and
    a first opaque label on a first side of the RFID inlay;
    wherein when attached to the surface, the first opaque label is between the RFID inlay and the surface, and the first opaque label is viewable through the surface while preventing view of the RFID inlay through the surface;
    wherein the first opaque label is with pre-cut lines; and
    wherein the anti-tamper passive RFID transponder and the pre-cut lines are configured and arranged such that when an attempted removal of the anti-tamper passive RFID transponder from the surface is performed, after being attached to the surface, the RFID antenna is damaged and the RFID inlay is rendered inoperable,
    wherein the anti-tamper passive RFID transponder further comprises at least one of:
        a Break-On-Removal (BOR) layer, wherein the BOR layer is configured and arranged to break the RFID antenna, during the attempted removal, to render the RFID inlay inoperable; or
        a Non-Removable Non-Transferable (NRNT) layer, wherein the NRNT layer is configured and arranged to break the RFID antenna, during the attempted removal, to render the RFID inlay inoperable, by having pre-cut lines across at least a part of the RFID antenna.

2. The anti-tamper passive RFID transponder of claim 1, wherein the RFID antenna is damaged in a way that at least a part of the RFID antenna stays with the opaque label on the surface, and at least another part of the RFID antenna is removed from the surface after the attempted removal.

3. The anti-tamper passive RFID transponder of claim 1, wherein the pre-cut lines are across at least a part of the RFID antenna or surrounding the entire RFID antenna.

4. The anti-tamper passive RFID transponder of claim 1, wherein the pre-cut lines surround the entire RFID antenna and the RFID IC chip.

5. The anti-tamper passive RFID transponder of claim 1, wherein the pre-cut lines surround one or more parts of the RFID antenna and the RFID IC chip.

6. The anti-tamper passive RFID transponder of claim 1, further comprising:
    a second opaque label on a second side of the RFID inlay, wherein the second side opposes the first side;
    wherein the first opaque label and the second opaque label cover the RFID inlay completely.

7. The anti-tamper passive RFID transponder of claim 1, wherein the surface is a windscreen, a windshield, a glass window, or a light cover of a vehicle.

8. The anti-tamper passive RFID transponder of claim 1, comprising the following layers in sequence:
    a transparent or clear top layer with adhesive;
    a first adhesive layer;
    a substrate layer;
    the BOR layer or the NRNT layer;
    an RFID inlay layer comprising the RFID inlay;
    a second adhesive layer with pre-cut lines;

a first opaque layer comprising the first opaque label with pre-cut lines;

a third adhesive layer for sticking on the surface; and a removable release layer or liner for covering the third adhesive layer, which is removed before the anti-tamper passive RFID transponder is attached to the surface.

9. The anti-tamper passive RFID transponder of claim 8, further comprising a second opaque label between the transparent or clear top layer with adhesive and the first adhesive layer.

* * * * *